(12) United States Patent
Kurisu et al.

(10) Patent No.: US 12,093,594 B2
(45) Date of Patent: Sep. 17, 2024

(54) INFORMATION PROCESSING DEVICE, PROGRAM, AND INFORMATION PROVIDING SYSTEM

(71) Applicant: JAPAN TOBACCO INC., Tokyo (JP)

(72) Inventors: Toshiharu Kurisu, Tokyo (JP); Sayako Sakuma, Tokyo (JP); Yusuke Okamura, Tokyo (JP); Yoshiyuki Habashima, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 480 days.

(21) Appl. No.: 17/442,170

(22) PCT Filed: Mar. 24, 2020

(86) PCT No.: PCT/JP2020/012832
§ 371 (c)(1),
(2) Date: Mar. 24, 2022

(87) PCT Pub. No.: WO2020/196446
PCT Pub. Date: Oct. 1, 2020

(65) Prior Publication Data
US 2022/0222025 A1    Jul. 14, 2022

(30) Foreign Application Priority Data
Mar. 27, 2019    (JP) .................................. 2019-061621

(51) Int. Cl.
*G06F 3/14*    (2006.01)
*G06F 3/01*    (2006.01)

(52) U.S. Cl.
CPC ............ *G06F 3/1423* (2013.01); *G06F 3/011* (2013.01)

(58) Field of Classification Search
CPC ............................... G06F 3/1423; G06F 3/011
See application file for complete search history.

(56) References Cited

U.S. PATENT DOCUMENTS

2017/0061491 A1*    3/2017    Kuwabara ............ H04N 23/63

FOREIGN PATENT DOCUMENTS

| EP | 1 085 432 A2 | 3/2001 |
| JP | 2006-113254 A | 4/2006 |
| JP | 2016-180830 A | 10/2016 |

OTHER PUBLICATIONS

Nov. 15, 2022 Extended European Search Report Issued in European Patent Application No. 20779589.9.
(Continued)

*Primary Examiner* — Jamil Ahmed
(74) *Attorney, Agent, or Firm* — Oliff PLC (57) ABSTRACT

To enable a user to know a smell or taste (of an object) that matches a specified description, when a card is placed on a sensing surface of a sensor, the description specifying unit specifies which card (or which description) is located at which position on the sensing surface. A first display control unit that controls a projector to display a related description group, which is a description group related to the description shown on the card. A priority specifying unit specifies a priority for each of the displayed related descriptions. A second display control unit displays a relationship between at least one related description included in the displayed related description group and an object that stimulates a sense of smell or taste described by the related description. On displaying the relation image, the relationship being displayed by an appearance in accordance with a specified priority.

9 Claims, 9 Drawing Sheets

(56) References Cited

OTHER PUBLICATIONS

International Search Report (English and Japanese) of the International Searching Authority issued in PCT/ JP2020/012832, mailed Jun. 16, 2020; ISA/JP (5 pages).

* cited by examiner

| CARD ID | SPECIFIED DESCRIP-TION | FIRST RELATED DESCRIP-TION | APPEARANCE OF FIRST RELATED DESCRIPTION | SECOND RELATED DESCRIP-TION | APPEARANCE OF SECOND RELATED DESCRIPTION | THIRD RELATED DESCRIP-TION | APPEARANCE OF THIRD RELATED DESCRIPTION | ... | N-TH RELATED DESCRIP-TION | APPEARANCE OF N-TH RELATED DESCRIPTION |
|---|---|---|---|---|---|---|---|---|---|---|
| CID001 | FIRST LOVE | SWEET | DISTANCE: 2 UNITS COLOR: RED FONT: GOTHIC SIZE: 25 POINTS MOVEMENT: BLINKING | FRESH | ... | FLOWER | ... | ... | ... | ... |
| CID002 | MORNING | FRESH | ... | FLOWER | ... | ... | ... | ... | ... | ... |
| CID003 | SPORTS FESTIVAL | ... | ... | ... | ... | ... | ... | ... | ... | ... |
| CID004 | CREEK | ... | ... | ... | ... | ... | ... | ... | ... | ... |
| CID005 | BLUE SKY | ... | ... | ... | ... | ... | ... | ... | ... | ... |
| ... | ... | ... | ... | ... | ... | ... | ... | ... | ... | ... |

FIG. 4

| SAMPLE ID | SAMPLE NAME | FIRST DESCRIPTION | SECOND DESCRIPTION | THIRD DESCRIPTION | ... | ... | M-TH DESCRIPTION |
|---|---|---|---|---|---|---|---|
| SID001 | A | SWEET | FLOWER | SPRING | ... | ... | ... |
| SID002 | B | FRESH | REFRESHING | ... | ... | ... | ... |
| SID003 | C | TRANSPARENCY | ... | ... | ... | ... | ... |
| SID004 | D | CALM | ... | ... | ... | ... | ... |
| SID005 | E | ... | ... | ... | ... | ... | ... |
| ... | ... | ... | ... | ... | ... | ... | ... |

INFORMATION PROCESSING DEVICE, PROGRAM, AND INFORMATION PROVIDING SYSTEM

TECHNICAL FIELD

The present invention relates to a technique for describing a smell or taste of an object.

BACKGROUND ART

Smells are known to provide various benefits to humans by stimulating the limbic system, which has a role in controlling emotion, behavior and memory. For example, Patent Document 1 discloses a method in which a subject smells a smell is asked questions about memories associated with the smell, and a numerical value is assigned to the answer, and is recorded.

PRIOR ART DOCUMENTS

Patent Document

[Patent Document 1] JP-A-2016-180830

SUMMARY

Problem to be Solved

Generally, it is difficult for people to accurately describe a smell to themselves or to others. This is because most people are not required to describe smells and thus they lack a working vocabulary to do so. Moreover, people tend not to be able to clearly recognize a correspondence between a smell and a description to be used for the smell.

Rather than describing a smell as outlined above, if a smell corresponding to a particular description can be created from that description, a new user experience can be created. For example, when a user specifies his/her favorite word, a new service which has not been provided until now, such as creating a smell in accordance with the word specified by the user, can be considered. Such a service is applicable not only to the smell of an object but also to the taste of an object.

Accordingly, the present invention enables a user to know a smell or taste (of an object) that matches a specified description.

Solution

To solve the above problems, according to one aspect of the invention, there is provided an information processing device including: a description specifying unit that specifies a description; a first display control unit that displays a related description group, which is a description group related to a sense of smell or taste that corresponds to the specified description; a priority-specifying unit that specifies a priority for each description included in the displayed related description group; a second display control unit that displays a relationship between at least one related description included in the displayed related description group and an object that stimulates a sense of smell or taste described by the related description, the relationship being displayed by an appearance in accordance with a specified priority.

The first display control unit may display descriptions corresponding to the specified description and which are defined descriptions that enable users to easily recall the smell or taste compared with the specified description, as the related description.

The priority specifying unit may specify a priority specified by a user.

The priority specifying unit may specify a priority based on at least one of an attribute, a preference, and an action of a user.

In a case that a plurality of the descriptions is specified, the first display control unit may display descriptions corresponding to each of the specified descriptions and which are defined descriptions that enable users to easily recall the smell or taste compared with the specified description.

The second display control unit may display a relationship between the related description having a high priority and a sense of smell or taste object described by the related description.

In a case that there are a plurality of related descriptions, the second display control unit may display a relationship between the plurality of related descriptions and an object having a smell or taste corresponding to all of the plurality of related descriptions.

The first display control unit may further display a group of similar descriptions, which are descriptions similar to the related descriptions, the priority specifying unit may specify a priority of the displayed similar description group, and the second display control unit may display a relationship between at least one similar description in the displayed similar description group and an object having smell or taste corresponding to the similar description.

According to another aspect of the invention, there is provided a program causing a computer to implement: a description specifying unit that specifies a description; a first display control unit that displays a related description group, which is a description group related to a sense of smell or taste that corresponds to the specified description; a priority-specifying unit that specifies a priority for each description included in the displayed related description group; a second display control unit that displays a relationship between at least one related description included in the displayed related description group and an object that stimulates a sense of smell or taste described by the related description, the relationship being displayed by an appearance in accordance with a specified priority.

According to yet another aspect of the invention, there is provided an information providing system including: an input device; a display device; and an information processing device including a description specifying unit that specifies a description specified by an input made via the input device; a first display control unit that controls the display device to display a related description group, which is a description group related to a sense of smell or taste that corresponds to the specified description; a priority-specifying unit that specifies a priority for each description included in the displayed related description group; a second display control unit that displays a relationship between at least one related description included in the displayed related description group and an object that stimulates a sense of smell or taste described by the related description, the relationship being displayed by an appearance in accordance with a specified priority.

Effect of the Invention

The present invention enables a user to understand an object that has the smell or taste, which matches a specified description.

DETAILED DESCRIPTION

Configuration

Figure 1:
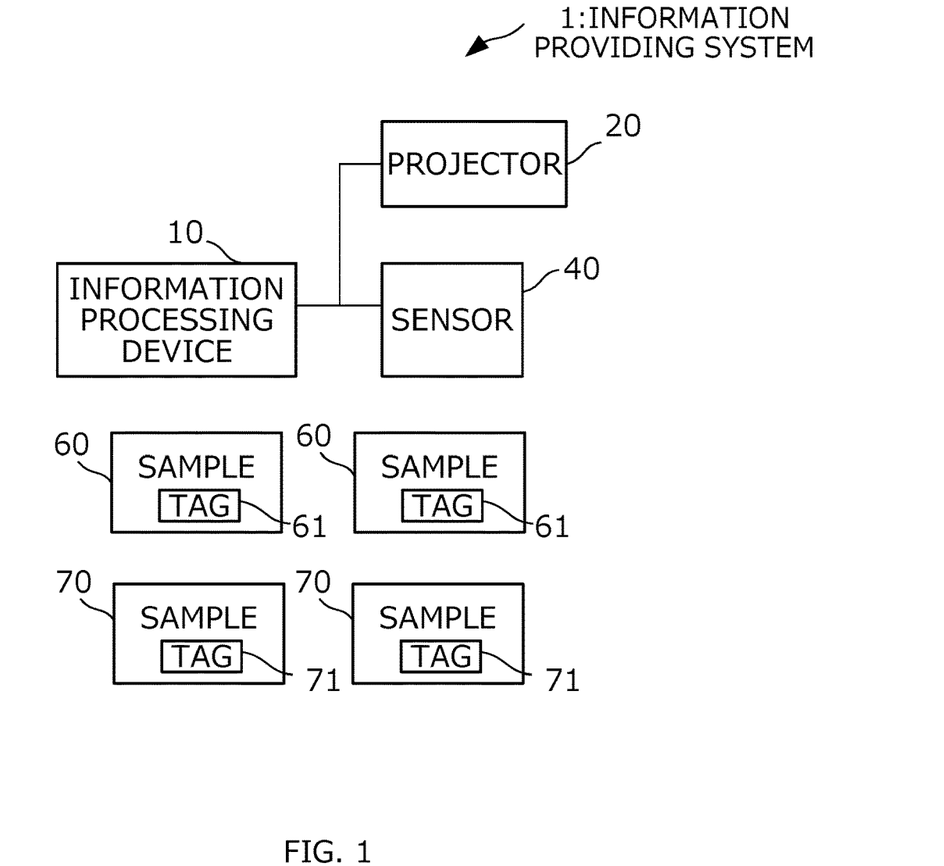
FIG. 1 is a block diagram illustrating an overall configuration of an information providing system according to an embodiment of the present invention.

The overall configuration of an information providing system 1 according to an embodiment of the present invention will now be described. The information providing system 1 is a system for providing information for showing an object having a smell that matches a description specified by a user. As shown in FIG. 1, the information providing system 1 includes an information processing device 10, a projector 20, a sensor 40, plural samples 60, and plural cards 70. The information processing device 10, the projector 20 and the sensor 40 communicate with each other via wired or wireless connections. The information processing device 10 is an example of an information processing device according to the present invention, and is a device that controls other devices in the information providing system 1. The projector 20 is an example of a display device that displays information to a user. The sensor 40 is an example of an input device that receives an input from a user.

Each of the plural samples 60 is an object that emits a smell that stimulates the user's sense of smell. For example, sample 60 may be a natural product (e.g., a lavender plant) or an artificial product that contains the smell of lavender (e.g., an extract of lavender in a volatile liquid form, a sheet impregnated with the liquid, or the like). In this embodiment, the sample 60 is a cylindrical vial that is sealed with a lid and contains a liquid in the form of an extract oil that emits a smell of a natural product. Each sample 60 has a label or a tag that includes the name of the sample (e.g., the name of the plant "lavender"). By referring to the label or tag name, the user is able to visually identify each sample.

The plural cards 70 are media on which different descriptions are shown. The description shown on the card 70 is prepared in advance, and may be a description using any of a language component such as a noun and an adjective, or may be a phrase comprising plural words in a sentence.

Figure 2:
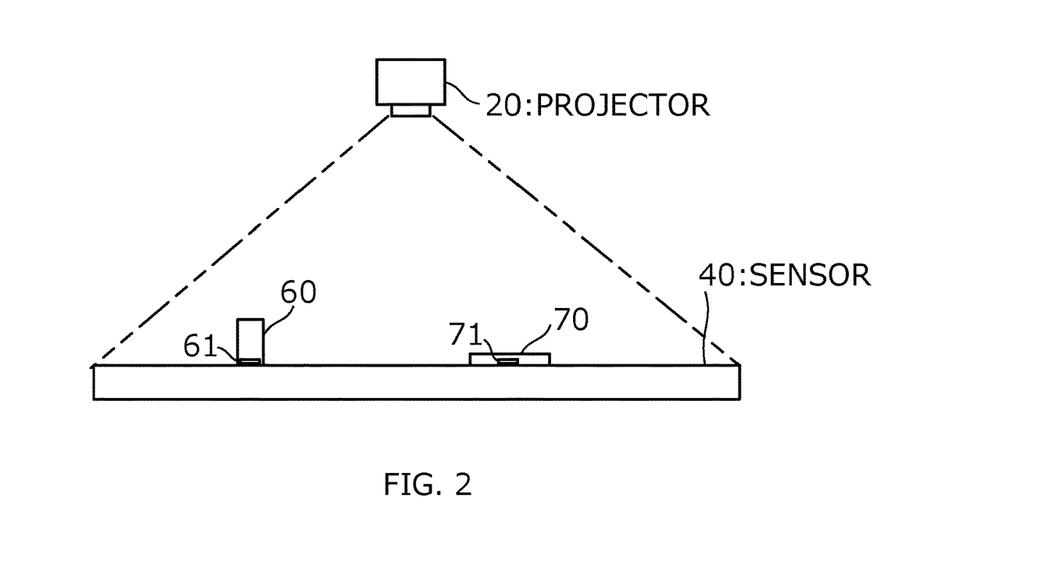
FIG. 2 is a side view illustrating the structure of the information providing system.

FIG. 2 is a side view illustrating a structure of the information providing system 1. More specifically, FIG. 2 is a view illustrating a positional relationship of the projector 20, the sensor 40, the sample 60, and the card 70 as viewed from a horizontal direction. The sensor 40 is constituted of, for example, a thin rectangular plate, an upper surface of which is a flat sensing surface. The sample 60 has a tag 61, which is a storage medium for storing identification information (hereinafter referred to as a "sample ID") for identifying each sample 60. The card 70 has a tag 71 which is a storage medium for storing identification information (referred to as a "card ID") for identifying each card 70.

When the sample 60 is placed on the sensing surface, the sensor 40 reads the sample ID stored in the tag 61 of the sample 60 by using, for example, a short-range wireless communication standard referred to as NFC (Near Field Communication), and detects the position where the sample 60 is placed (i.e., the position where the tag 61 is read on the sensing surface). When the card 70 is placed on the sensing surface, the sensor 40 reads the card ID stored in the tag 71 of the card 70 by using a short-range wireless communication standard such as NFC, and detects the position where the card 70 is placed (i.e., the position where the tag 71 is read on the sensing surface). Furthermore, the sensor 40 also functions as a so-called touch screen, and detects a touched position on the sensing surface when a user touches the sensing surface with, for example, a user's finger or a predetermined pointing device. The position where the sample 60 is placed or the position touched by the user is described as X, Y coordinates in a two-dimensional coordinate plane wherein a specified position of the sensing surface serves as an origin.

The projector 20 is installed above the sensor 40 (for example, on a ceiling of a room). As indicated by the dashed line in FIG. 2, the projector 20 has a projection area that covers an entire area of the sensing surface of the sensor 40, and is capable of projecting an image to any position on the sensing surface defined by the X and Y coordinates. In other words, the sensing surface of the sensor 40 also functions as a display surface on which an image is displayed.

Figure 3:
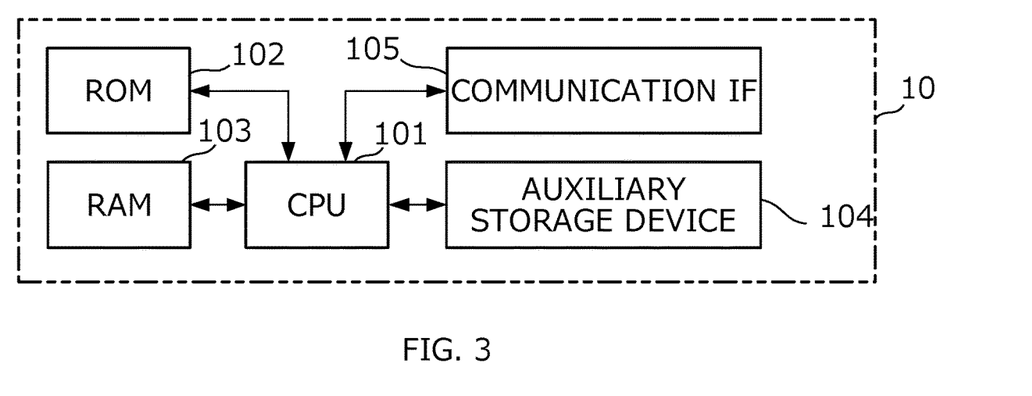
FIG. 3 is a block diagram illustrating an example of a hardware configuration of an information processing device according to an embodiment of the present invention.

FIG. 3 is a diagram illustrating a hardware configuration of the information processing device 10. The information processing device 10 is a computer that includes a CPU (Central Processing Unit) 101, a ROM (Read Only Memory) 102, a RAM (Random Access Memory) 103, an auxiliary storage device 104, and a communication IF (Interface) 105.

The CPU 101 is a processor that performs various operations. The ROM 102 is, for example, a non-volatile memory that stores, for example, a program and data used for booting the information processing device 10. The RAM 103 is a volatile memory that functions as a work area when CPU 101 executes the program. The auxiliary storage device 104 is a nonvolatile storage device such as, for example, a HDD (Hard Disk Drive) or an SSD (Solid State Drive), and stores a program and data used in the information processing device 10. By executing the program, the CPU 101 realizes the functions described below and also executes the operations described below. The communication IF 105 is an interface that performs communication in accordance with a predetermined communication standard. The communication standard may be a standard for a wired communication or a standard for a wireless communication. In addition to the configuration illustrated in FIG. 3, the information processing device 10 may include other elements such as a display device such as a liquid crystal display or an input device such as a keyboard.

Figure 4:
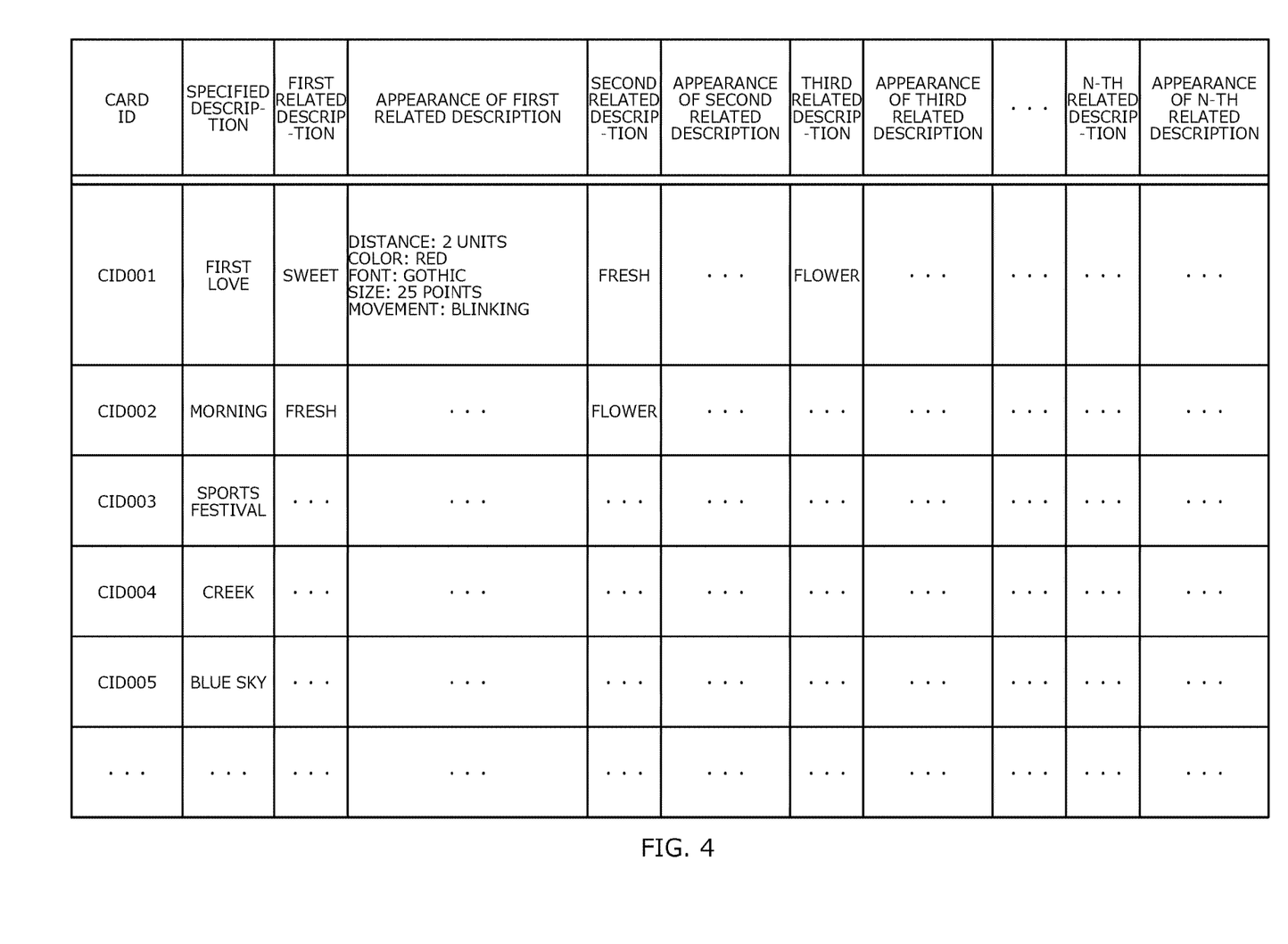
FIG. 4 is a diagram illustrating an example of a card DB stored in the information processing device.
Figure 5:
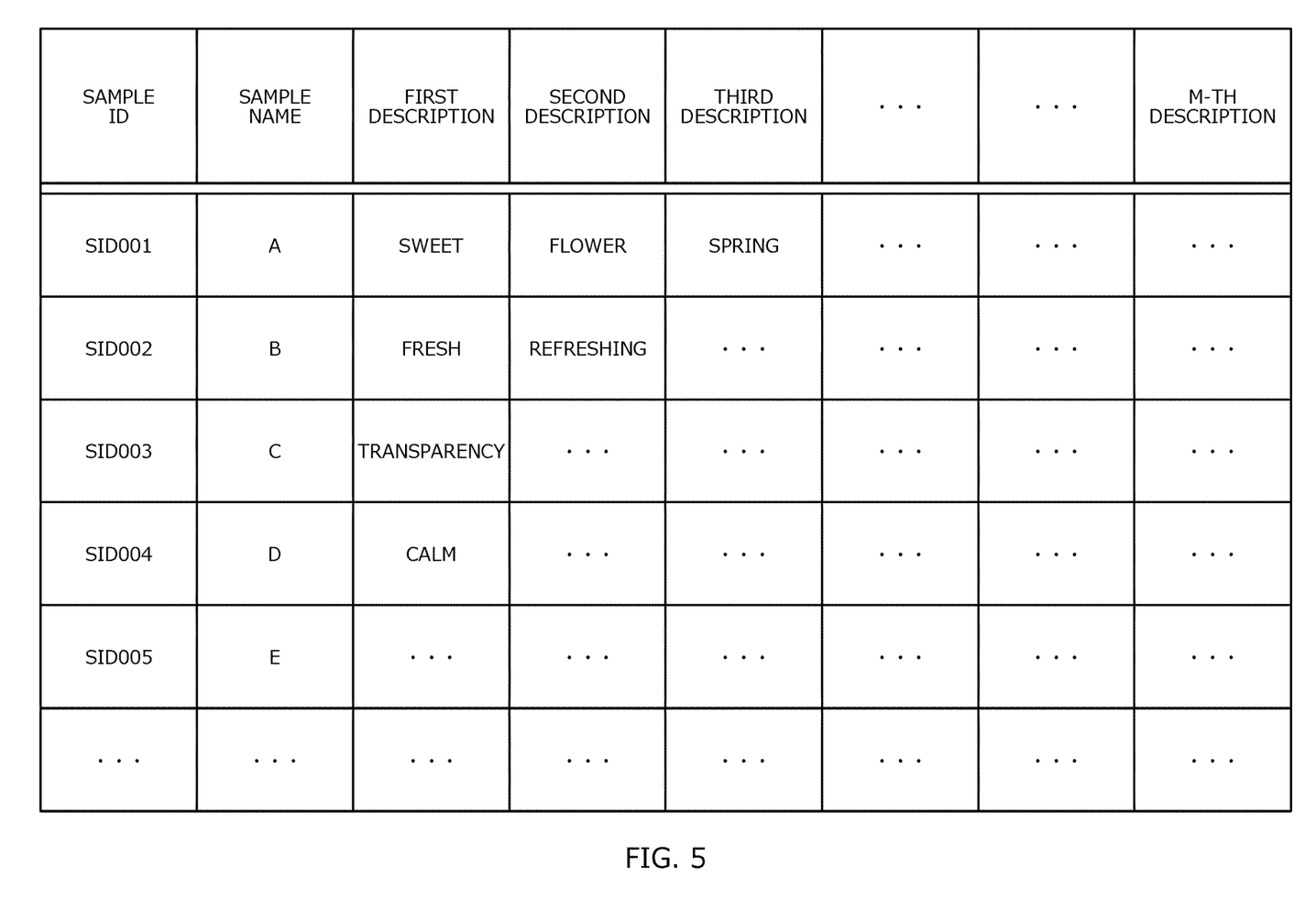
FIG. 5 is a diagram illustrating an example of a sample DB stored in the information processing device.

The auxiliary storage device 104 stores a card database (hereinafter, simply referred to as a card DB) as shown in FIG. 4, and a sample DB as shown in FIG. 5. As shown in FIG. 4, the card DB includes a card ID, a description (or a specified description) written on the card corresponding to the card ID, one or more descriptions (or related descriptions) relating to a sense of smell corresponding to the specified description, and an appearance for displaying each of these related descriptions. A related description group is a description group having a meaning relating to the specified description, and is a description group commonly used as a description by which a user finds it easier to recall a sense of smell as compared to when the specified description is used, that is, a description meaning a smell. The related description may be consist of any component part of language, such as a noun or adjective, or may be a phrase consisting of plural words used to compose a sentence. When the card 70 is placed on the sensor 40, a related description group corresponding to the description (or the specified description) written on the card 70 is displayed in the vicinity of the card 70.

The appearance of the related description includes, for example, a position for displaying the related description, a distance between the position for displaying the related description and the position of the card 70, a direction of the display position of the related description with respect to the card 70, a color of the related description, a size of the related description, a font of the related description, a modification of the related description, a timing for displaying the related description, a time duration for displaying the related description, a motion of the related description (including a spatial change or a temporal change in the description), or a language used for the related description. The appearance varies depending on the relationship between the specified description and the related description, and/or the attribute of the related description. The relationship between the specified description and the related description is, for example, shown by the strength/size of the display of relationship. When the relationship between the specified description and the related description is strong (i.e., the specified description readily reminds the user of the related description), the related description may be displayed near the card 70 or in a large or conspicuous color, or the related description may be displayed in a conspicuous manner by through movement of the related description so as in a vibration. The attribute of the related descriptions include, for example, images to be received from the related descriptions, parts of speech of the related descriptions, types of characters to be used for the related descriptions (Japanese hiragana, Japanese katakana, Japanese kanji, alphabets, etc.), a number of characters/number of words to be used for related descriptions, etc. For example, the related description "sweet" may be displayed in a warm color or in a rounded gothic font.

In FIG. 4, the card 70 having the card ID "CID001" has a specified description "First Love," the first related description is "sweet," and the second related description is "refreshing." Among these related descriptions, the appearance of the first related description "sweet" is the distance between the position where the related description is displayed and the position where the card 70 is displayed, which is "2 units" (a unit is a length determined along the sensing plane), the color is "red," the font is "gothic," the size is "25 points," and the motion is "flashing." In the related description N, the smaller the value of N is, the stronger or larger the relationship is with the specified description. That is, in the example shown in FIG. 4, the related description having the strongest relationship or the greatest relationship with the specified description "first love" is "sweet."

Next, in the sample DB, each sample ID and one or more descriptions (i.e., one or more descriptions describing the smell of the sample 60) relating to the sense of smell stimulated by the sample 60 corresponding to the sample ID are associated with one another as shown in FIG. 5. This description is the same as the related description group in the card DB described above. In the example shown in FIG. 5, the sample name of the sample 60 having the sample ID "SID001" is "A," and "sweet" is recorded as the first description describing the smell of the sample 60, "flower" is recorded as the second description, and "spring" is recorded as the third description. Regarding the M-th description, the smaller the value of M is, the stronger or larger the relationship is with the sample 60. That is, in the example shown in FIG. 5, the description having the strongest relationship or the greatest relationship with the sample "A" is "sweet."

Figure 6:
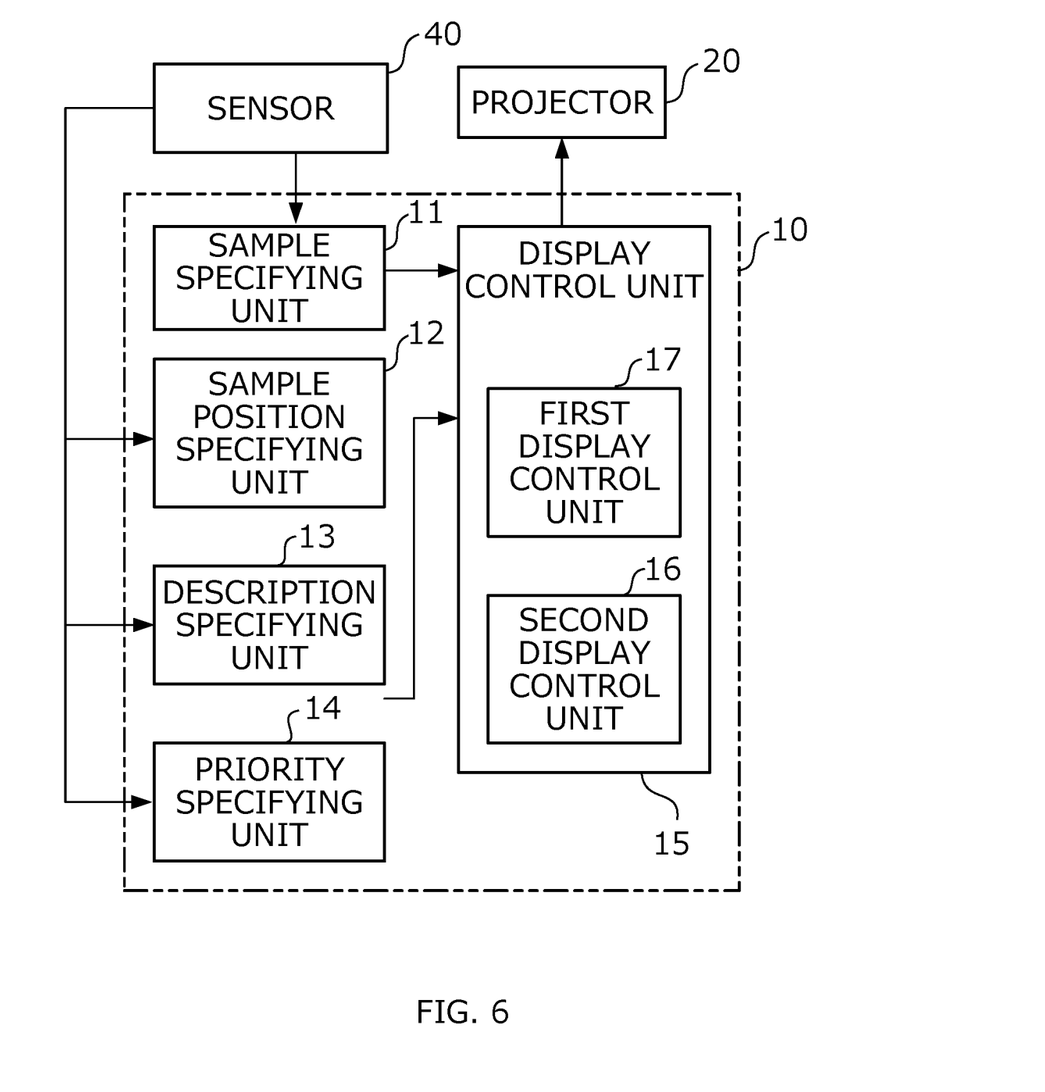
FIG. 6 is a block diagram illustrating an example of a functional configuration of an information processing device.

Next, FIG. 6 shows a block diagram illustrating an example of the functional configuration of the information processing device 10. A sample specific unit 11, a sample position specifying unit 12, a description specifying unit 13, a priority specifying unit 14, a first display control unit 15, and a second display control unit 16, are implemented in the information processing device 10. It is of note that the display control unit 17 includes both the first display control unit 15 and the second display control unit 16.

When the sample 60 is placed on the sensing surface of the sensor 40, the sample specifying unit 11 specifics which sample 60 is placed on the sensing surface based on the read sample ID stored in the tag 61 of the sample 60.

Furthermore, when the sample 60 is placed on the sensing surface of the sensor 40, the sample location unit 12 specifics where the sample 60 is placed on the sensing surface (i.e., the position where the sample 60 is placed on the sensor 40) based on the position where the sample ID stored in the tag 61 of the sample 60 was read.

When the card 70 is placed on the sensing surface of the sensor 40, the description specifying unit 13 specifies which card 70 (i.e., specifies the description) is placed at which position on the sensing surface based on the reading result of the card ID stored in the tag 71 of the card 70.

The first display control unit 15 controls the projector 20 to display, in a display area corresponding to the position of the card 70 specified by the description specifying unit 13, a related description group corresponding to the specified description written on the card 70. At this time, the first display control unit 15 displays the related description group by an appearance corresponding to the related description specified by the description specifying unit 13 in the card DB. The display area corresponding to the position of the card 70 is, for example, an area on the sensing surface within a range of a distance determined from the position of the card 70, and specifically, an example is considered in which the area is a circular area within a radius of 10 cm centered on the position of the card 70 at the sensing surface. However, the display area corresponding to the position of the card 70 is not limited to this example, and may be an area where the user can recognize which sample description is the displayed description.

The priority specifying unit 14 specifies a priority of each of the related description groups displayed by the first display control unit 15. Specifically, if a user selects (or specifies) any one of the related displayed descriptions, a priority of the selected related descriptions is increased. At this time, if multiple descriptions are selected by the user, a priority of the multiple descriptions in order is made higher.

The second display control unit 16 displays a relationship between at least one related description from among the description groups displayed by the first display control unit 15, and a sense of smell object indicated by the related description. At this time, the second display control unit 16 displays the above relationship by an appearance corresponding to the priority specified by the priority specifying unit 14. Specifically, if any one of the displayed related description groups is selected by the user, the second display control unit 16 displays the relationship image, which is an image describing a relationship between the selected related description and the sample 60 having a smell suitable for the related description. The relationship image is displayed by an appearance corresponding to the selected priority, as will be described in detail later with reference to FIG. 11.

Operation

An exemplary operation of the present embodiment will now be described with reference to the flowchart shown in FIG. 7. First, the user selects samples 60 of interest by referring to the names of the samples shown on the samples 60, and places the samples on the sensing surface of the sensor 40.

Figure 7:
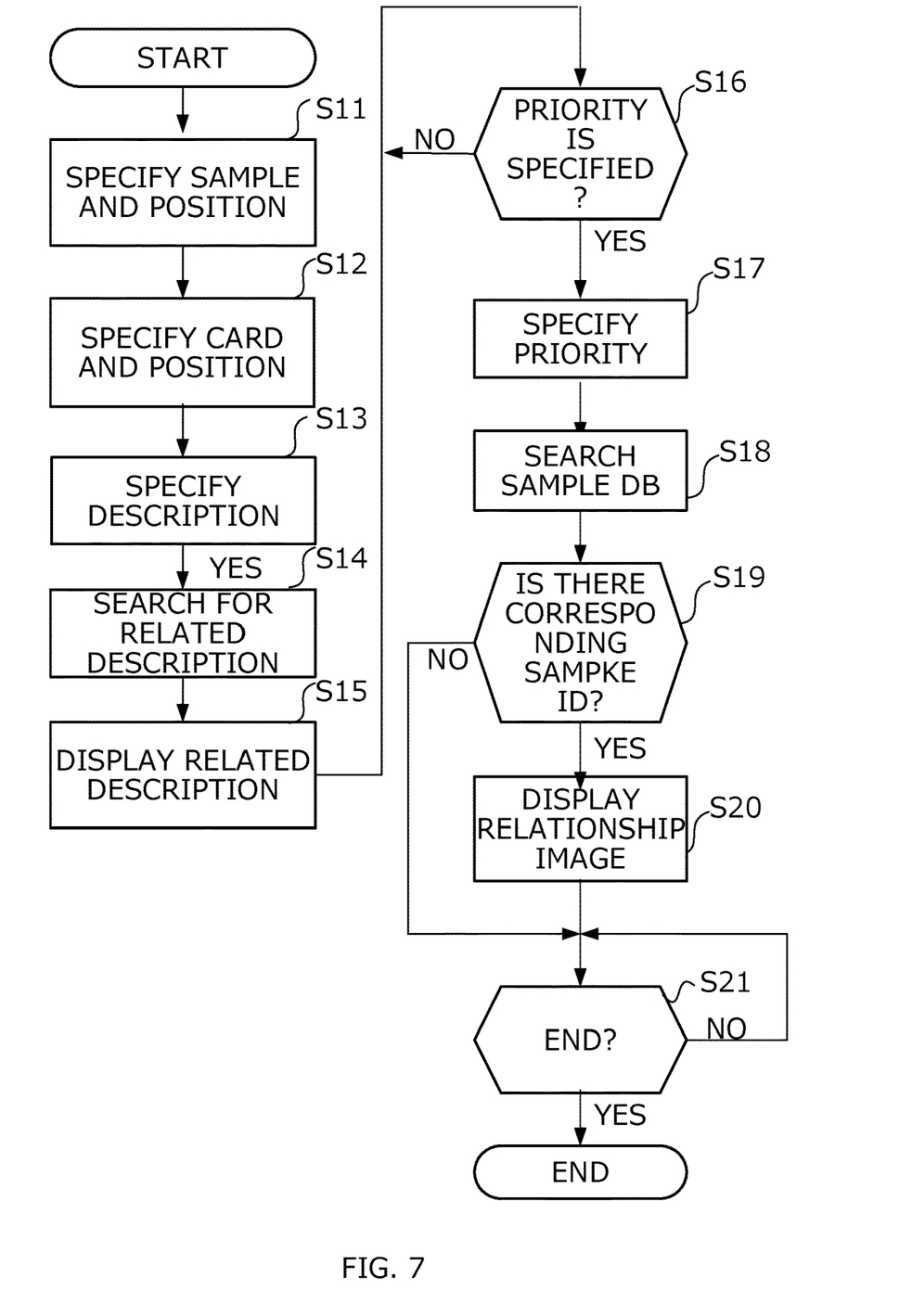
FIG. 7 is a flowchart illustrating an example of the operation of the information processing device.
Figure 8:
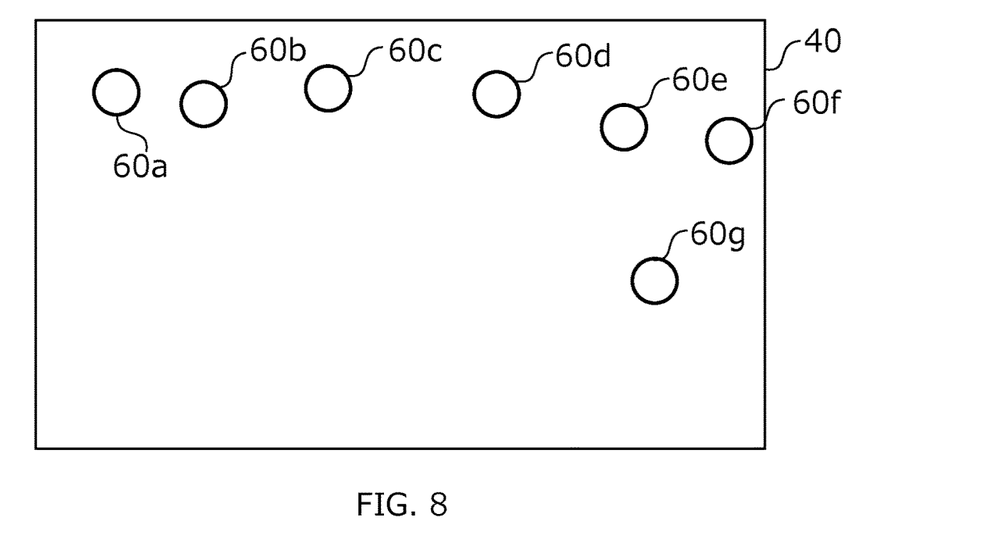
FIG. 8 is a plan view illustrating the information providing system viewed from above the sensing surface of the sensor.

In FIG. 8 a plan view is shown that illustrates the sensor 40 with the sensing surface of the sensor 40 as viewed from above. In this example, six samples 60*a*-60*f* are placed on the sensing surface of sensor 40. At this time, the sample specifying unit 11 and the sample position specifying unit 12 of the information processing device 10 specify which sample ID of the sample 60 is placed at which position on the sensing surface, based on the sample ID read by the sensor 40, (at step S11 in FIG. 7). In this example, it is specified that samples 60*a*-60*f* are placed at each of the positions shown in FIG. 8.

Figure 9:
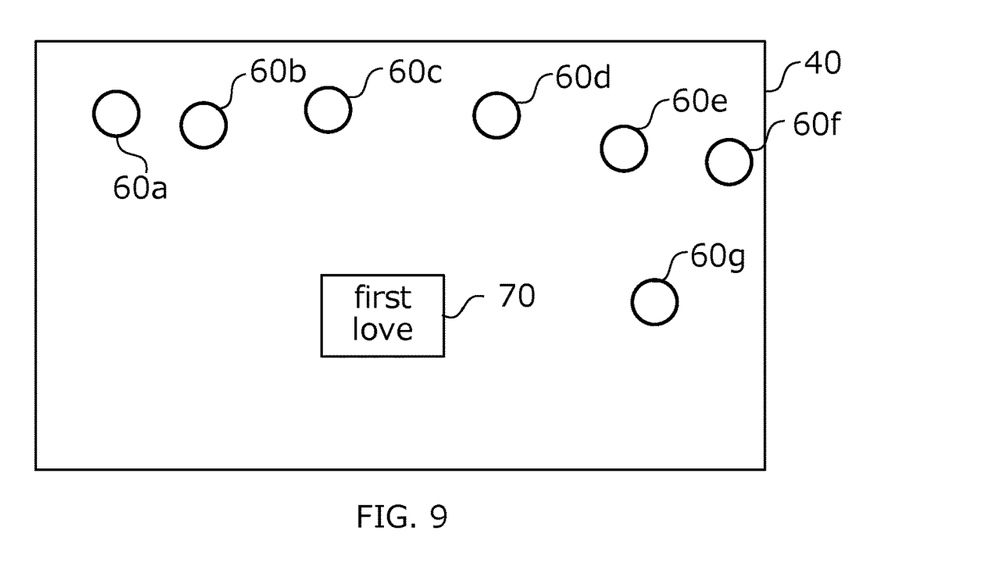
FIG. 9 is a plan view illustrating the information providing system viewed from above the sensing surface of the sensor.

Next, the user selects the card 70 having the description he/she prefers, refers to the description on the card 70 and places the card on the sensing surface of the sensor 40. FIG. 9 shows a plan view of the sensor 40 with the sensing surface of the sensor 40 as viewed from above. In this example, a card 70 with a description "first love" is placed on the sensing surface of the sensor 40. At this time, the description specifying unit 13 of the information processing device 10 specifies at which position on the sensing surface the card 70 of which card ID is placed based on a reading result of the card ID by the sensor 40, (at step S12 in FIG. 7). As a result, it is specified that the card 70 marked "first love" is placed at the position illustrated in FIG. 9.

Next, the first display control unit 15 searches (at steps S13 and S14 in FIG. 7) the card DB for a related description corresponding to the card ID using the card ID of the card 70 as a search key. Then, the first display control unit 15 controls the projector 20 to display (at step S15 in FIG. 7) in a display area corresponding to the position of the card 70 specified by the description specifying unit 13, the related description retrieved at step S14, by an appearance corresponding to the related description.

Figure 10:
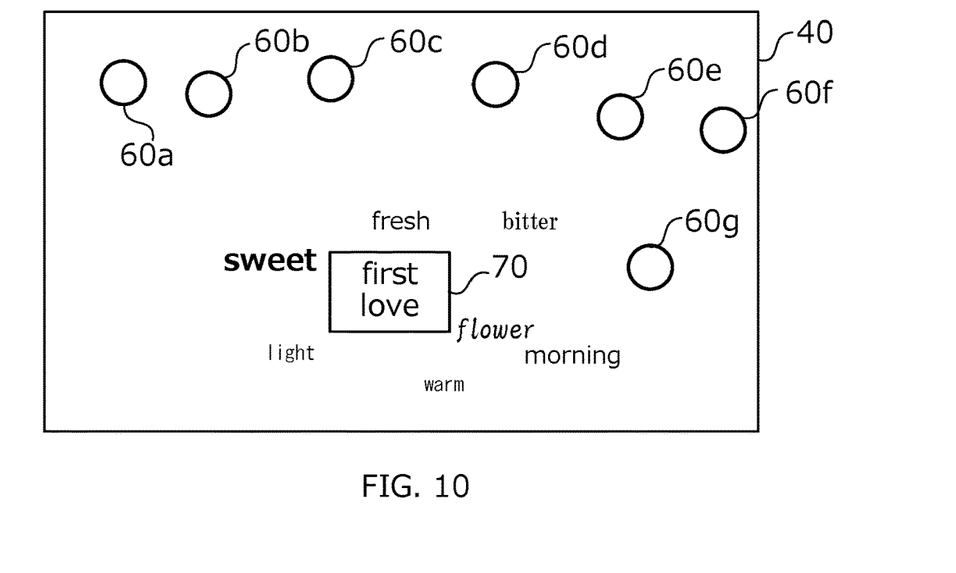
FIG. 10 is a plan view illustrating the information providing system viewed from above the sensing surface of the sensor.

As shown in FIG. 10, the descriptions related to the specified description "first love" written on the card 70 are displayed inside a circle of a set size centered on the position of the card 70, for example. The related descriptions are displayed by an appearance defined by the card DB, as described above. For example, in the example shown in FIG. 10, related description groups including descriptions "sweet," "refreshing," "bitter," "light," "warm," "flower," and "morning" are displayed by an appearance determined for each, in the vicinity of the card 70 having the description "first love."

Next, the user performs an input operation to specify a description that has a higher priority than the other descriptions. The user specifies the priority based on his/her preference for the description of the smell from among the displayed related descriptions. This input operation consists of, for example, touching a related description to which a higher priority is given, by way of a pinch-out motion so as to enlarge the related description (to which priority is given), to move the related description to which priority is given closer to the card 70 by use of a drag operation, or the like. On the other hand, the user may perform an input operation to specify a related description that he/she does not prefer, and as a result, specify a related description that he/she prefers. The input operation by which the user specifies a related description that he/she does not prefer is, for example, one that hides the related description that he/she does not prefer by use of a predetermined operation whereby the non-preferred related description is made smaller by use of pinching-in touch operation, or one that moves the related non-preferred description further away from the card 70 by a touch drag operation.

When such an input operation is performed (at step S16 in FIG. 7; YES), the priority specifying unit 14 specifies (at step S17 in FIG. 7) the priority specified by the user. At this time, so as to indicate to the user a related description to which the high priority has been allocated, preferably the first display control unit 15 displays the background of the related description as an image in a specific color or highlights the related description. Here, it is assumed that the first priority is allocated to "sweet" and the second priority is allocated to "refreshing" by sequentially touching the related descriptions "sweet" and "refreshing" from among "sweet," "refreshing," "bitter," "light," "warm," "flower" and "morning" as illustrated in FIG. 10.

Next, the second display control unit 16 searches (at step S18 in FIG. 7) the sample DB for a sample ID that corresponds to the same description as the high-priority related description specified at step S17, from among the sample ID groups specified at step S11. As a result of the search, if there is a sample ID corresponding to the same description as the high-priority related description (at step S19 in FIG. 7; YES), the second display control unit 16 controls the projector 20 to display (at step S20) the relationship image. The relationship image is, for example, a linear image connecting the display position of the high-priority related description and the position where the sample 60 corresponding to the retrieved sample ID is placed.

Figure 11:
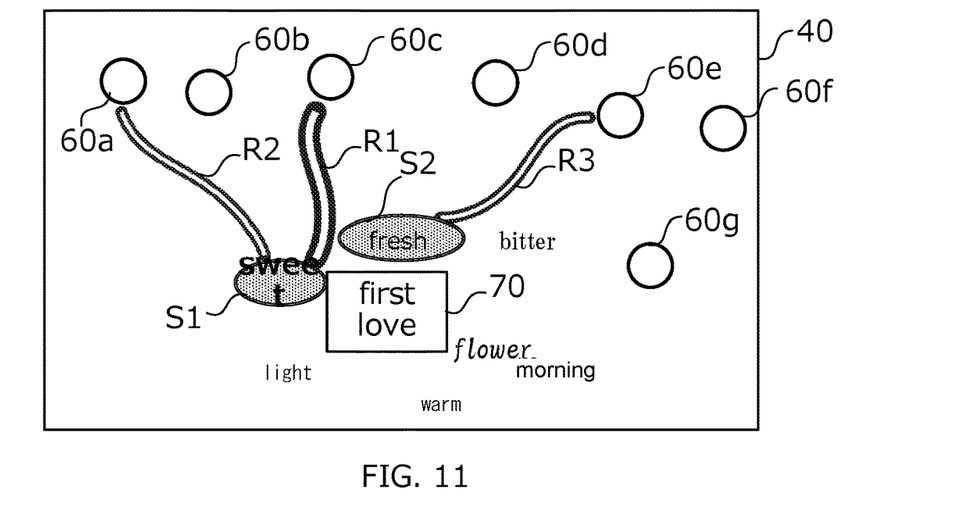
FIG. 11 is a plan view illustrating the information providing system viewed from above the sensing surface of the sensor.

As a result, as illustrated in FIG. 11, linear relationship images R1 and R2 connecting the related description "sweet" specified by the user with the highest priority and the sample (here, the sample 60*a* and the sample 60*c*) with the related description "sweet" is displayed. From these relationship images R1 and R2, the user is able to understand that the samples 60*a* and 60*c* are samples having the smell of the related description "sweet" specified by the user. Further, a linear relationship image R3 is displayed. The linear relationship image R3 connects the related description "refreshing" with the next higher priority description specified by the user and a sample (here, referred to as a sample 60*e*) corresponding to the related description "refreshing."

From this relationship image R3, the user is able to understand that the sample 60e is a sample that emits the smell of the related description "refreshing." Further, as shown in FIG. 11, the system informs the user of a related description for which the higher priority is allocated, by displaying the background of the related description in the images 51 and S2 in a particular color. The system informs the user of the high and low priorities of related descriptions with higher priorities being made visible to the user by a change in the color and size of the images 51 and S2.

Appearances such as color, thickness, size, and motion of the relationship image differ depending on a priority specified for the related description. For example, a higher a priority that is specified for the related description, a more conspicuous a relationship image is that connects the related description and the sample 60. In contrast, a lower a priority is, a less conspicuous an appearance is. In the example shown in FIG. 11, the relationship image for the related description "sweet" having top priority is an image having a darker color than the relationship image for the related description "refreshing" having second top priority. That is, the second display control unit 16 displays the relationship between the related description and the sense of smell object described by the related description in an appearance according to the selected priority.

The appearance such as a color, a thickness, a size, a motion, and the like of the relationship image differs depending on the relationship between the related description and the sample 60 of the smell description of the related description. For example, when the relationship between the related description and the sample 60 is strong, the appearance such as the color, thickness, size, motion, or the like in which the relationship image is more conspicuous is displayed, and when the relationship is weak, the appearance is less conspicuous. The strength/size of the relationship between the related description and the sample 60 may be specified by the numerical value M allocated to the description in the sample DB, as described above. That is, the smaller the value M is, the stronger or larger the relationship is between the related description and the sample 60. In the example shown in FIG. 11, since the sample 60c has a stronger relationship with the related description "sweet," the relationship image R1 connecting the related description "sweet" and the sample 60c is an image that is thicker than the relationship image R2 connecting the related description "sweet" and the sample 60a.

The user views these displays and as a result is able to understand an object having a smell that matches the description specified by the user by smelling the sample 60, while the user is also made aware of the specified description and the relationship between the related description and the sample 60. If the user wishes to try another specified description, the user performs an end operation (at step S21; YES). Then, the user places another card 70 on the sensing surface of the sensor 40 to perform the above steps S11 to S20 for another description.

According to the embodiment described above, the user is able to identify an object that has a smell matching the description specified by the user.

Modification

The present invention is not limited to the embodiments described above. The embodiment described above may be modified as follows. Further, two or more items in the following modified examples may be combined.

First Modification

The present invention may be applied not only to the smell sense but also to the taste sense (e.g., gustatory objects such as wine, Japanese rice wine, spice, seasoning, etc.). That is, the present invention may be implemented by replacing "smell" in the embodiment with "taste."

Second Modification

In the above embodiment, the user specifies a description from among descriptions included in the specified description groups prepared in advance. However, the method of specifying the description is not limited thereto. For example, the user may input a description as a word to the input device. Alternatively, the user may select a description from a book or the like and input the description to the input device. Further, the method for inputting the description is not limited to a manual operation performed by the user, and an input may be made via voice or remote gesture.

Third Modification

In the above-described embodiment, the related description specified by the user from the related description group is specified as the related description with high priority, but the method for specifying the priority is not limited thereto. For example, data relating to at least one of an attribute, a preference, and a behavior of a user may be accumulated, and a related description matching at least one of the attribute, the preference, and the behavior of the user may be estimated from the accumulated content (e.g., a description preferred by women in their twenties, a description preferred by a user watching movies as a hobby, a description preferred by a user having a travel preference, and the like) to specify the priority. The relationship between the user's attributes, preferences or actions and the related description for which the user of such attributes, preferences or actions specifies a high priority may be specified using an algorithm learned by machine learning, such as deep learning, based on, for example, a history specified as a preferred related description by the user.

Fourth Modification

In the above embodiment, one description is specified as the specified description, but plural descriptions may be specified as the specified descriptions. In this case, the first display control unit 15 may preferentially display a related description group corresponding to any of the plural specified descriptions, and which are determined as descriptions by which the user finds it easier to recall a sense of smell as compared to when the specified descriptions are used. For example, it is assumed that a card 70 having a description "first love" and another card 70 having a description "blue sky" are placed on the sensing surface of the sensor 40. In this example, it is supposed that the specified description "first love" corresponds to the related description group "sweet," "refreshing," "bitter," "light," "warm," "flower," and "morning," while the specified description "blue sky" corresponds to the related description group "refreshing," "clear," "refreshing," and "morning." In such a case, the first display control unit 15 preferentially displays "refreshing" and "morning," which are related descriptions common to the specified descriptions, for example, thick lines, conspicuous colors, conspicuous movements, large characters, and the like so that the commonality can be understood.

Fifth Modification

Figure 12:
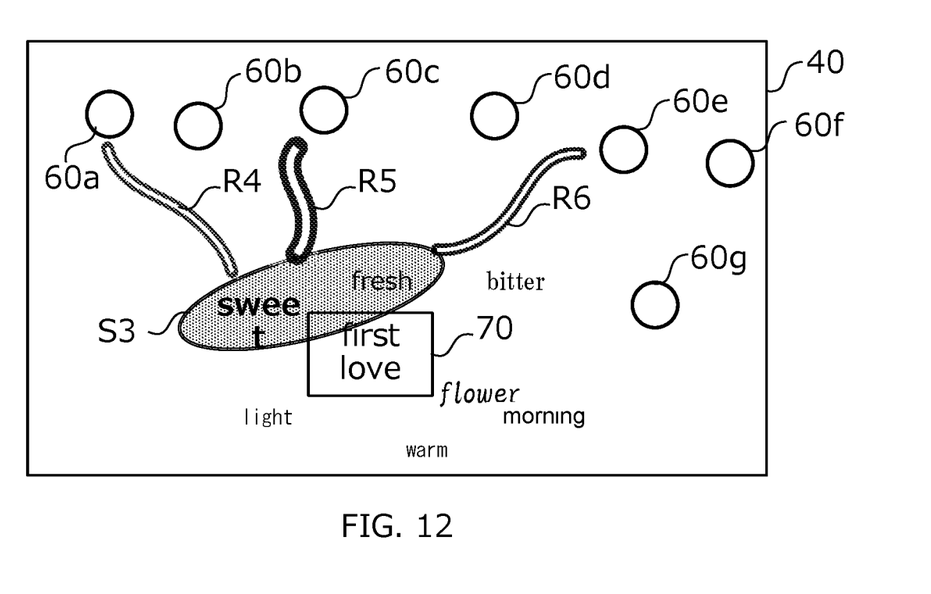
FIG. 12 is a plan view illustrating the information providing system viewed from above the sensing surface of the sensor.

In the above embodiment, when plural related descriptions having a high priority are specified, the relationship between each of the related descriptions having a high priority and the sample 60 is displayed as illustrated in FIG. 11. However, the relationship between the entirety of the plurality of the related descriptions having a high priority and the sample 60 may also be displayed. Specifically, as illustrated in FIG. 12, the second display control unit 16 displays linear relationship images R1, R2, and R3 connecting a related description "sweet" and a related description "refreshing," which are specified as having higher priorities by the user, and samples 60a and 60c corresponding to the related description "sweet" and a sample 60e corresponding to the related description "refreshing." That is, when there are plural related descriptions having a high priority (or a priority that exceeds a threshold), the second display control unit 16 may display a relationship between the plural related descriptions and the sense of smell object described by all of the plural related descriptions.

Sixth Modification

In FIG. 11, if the user specifies the related description "sweet," for example, a group of descriptions similar to the related description "sweet" such as "sweet sour," "sweet honey," and "slight sweet" is further displayed, and when the user specifies a high priority for any similar description related to these descriptions, the relationship between the specified similar description and the sample 60 may be displayed. That is, the first display control unit 15 may display a similar description group that has a similar description to the related description, the priority specifying unit 14 may specify the priority of the displayed similar description group, and the second display control unit 16 may display the relationship between at least one similar description from among the displayed similar description groups and the sense of smell object described by the similar description by an appearance according to the selected priority.

Seventh Modification

The relationship image is not limited to the linear image illustrated in FIGS. 11 and 12, and may be an image that shows a relationship between the related description and the sample 60 described by the related description. For example, in FIGS. 11 and 12, an annular image surrounding the related description "sweet" and an annular image surrounding the position of the samples 60a and 60c described by the description "sweet" may be used as a relationship image. Similarly, in FIGS. 11 and 12, an annular image surrounding the related description "refreshing" and an annular image surrounding the position of the sample 60ec described by the description "refreshing" may be used as a relationship image.

Eighth Modification

In the above embodiment, the second display control unit 16 displays the relationship between the high-priority related description and the sense of smell object described by the related description in an appearance corresponding to the priority, but the present invention is not limited thereto, and the relationship image indicating the relationship between all the related descriptions and the sense of smell object described by each related description may be displayed, and the relationship image may be displayed by an appearance corresponding to the selected priority. For example, in the example shown in FIG. 11, the second display control unit 16 displays a relationship image connecting each related description "sweet," "refreshing," "bitter," "light," "warm," "flower" and "morning" and the sample 60 corresponding to each related description. At this time, the second display control unit 16 displays the relationship image having the high priority and the relationship image of the sample 60 by an appearance such as a color, a thickness, a size, and a motion different from those of the other relationship images. That is, the second display control unit 16 may display the relationship between at least one or more related descriptions included in the displayed related description group and the sense of smell object described by the related description by an appearance according to the selected priority.

Ninth Modification

The display device and the input device are not limited to the projector 20 or the sensor 40 illustrated in FIG. 1. For example, the display device is not limited to projecting an image on the sensing surface of the sensor 40, which is an input device as in the embodiment, and the input device may be a display device. Further, the display device may display an image on a wall surface (including a case of projecting an image on the wall surface). The display device may also be a display device that realizes so-called augmented reality. Specifically, when the sample 60 is imaged by an imaging device of a smart phone, tablet, or a glass type wearable device, a corresponding description group may be displayed around the sample 60 in the imaged image. The input device may be a device that detects a user's operation using an image recognition technique.

Tenth Modification

The description may be displayed in a two-dimensional form or a three-dimensional form. Further, the specified description or the related description is not limited to characters, and may be a color, an abstract form, an image such as a person/scene, or the like.

The present invention may be provided as an information processing method including processing steps performed in the information processing device 10. The present invention may also be provided as a program executed by the information processing device 10. Such a program may be provided on a recording medium such as an optical disk, or may be downloaded to a computer for installation via a network such as the Internet.

While the present invention has been described in detail above, it will be apparent to those skilled in the art that the present invention is not limited to the embodiments described herein. The present invention may be implemented with modifications and variations without departing from the scope of the invention as defined by the claims. Accordingly, the description herein is for illustrative purposes only and is not limitative of the invention.

DESCRIPTION OF REFERENCE NUMERALS

1 . . . Information providing systems, 20 . . . projectors, 40 . . . sensors, 60 . . . samples, 61 . . . tags, 70 . . . cards, 71 . . . tags, 101 . . . CPU, 102 . . . ROM, 103 . . . RAM, 104 . . . ancillary storage devices, 105 . . . communication IFs, 11 . . . sample identification units, 12 . . . sample position identification units, 13 . . . description identification units, 14 . . . priority identification units, 15 . . . first description control units, 16 . . . second description control units, 17 . . . display control units.

The invention claimed is:

1. A system comprising:
a computer;
a card including a first non-transitory storage medium for storing first identification information;
an object including a second non-transitory storage medium for storing second identification information; and
a sensor being configured to obtain the first and the second identification information via near field communication and transmit the first and the second identification information to the computer;
wherein the computer is configured to:
identify a card description based on the first identification information stored in the first non-transitory storage medium of the card;

identify a sense of smell or taste associated with the object based on the second identification information stored in the second non-transitory storage medium of the object;

control a projector to display a related description group comprising a plurality of related descriptions, the related description group being related to the sense of smell or taste that corresponds to the card description;

specify a priority for each related description included in the displayed related description group; and control the projector to display a relationship between at least one of the related descriptions included in the related description group and the object that is associated with the sense of smell or taste described by the at least one of the related descriptions, the relationship being displayed differently depending on the priority.

2. The system according to claim 1, wherein the related descriptions enable users to easily recall the smell or taste compared with the card description.

3. The system according to claim 1, wherein the priority is specified based on an input of a user.

4. The system according to claim 1, wherein the priority is specified based on at least one of an attribute, a preference, and an action of a user.

5. The system according to claim 1, wherein in a case that a plurality of the card descriptions is specified,
the computer is configured to control the projector to display related descriptions corresponding to each of the card descriptions, the related descriptions enabling users to easily recall the smell or taste compared with the card descriptions.

6. The system according to claim 1, wherein the priority that is specified for the at least one of the related descriptions is higher than the priority specified for another of the related descriptions.

7. The system according to claim 1, wherein the computer is configured to cause the projector to display relationships, including the relationship between the at least one of the related descriptions and the object, between the plurality of related descriptions and a respective object having a smell or taste associated with the sense of smell or taste described by each description of the plurality of related descriptions.

8. The system according to claim 1, wherein
the computer further controls the projector to display a group of similar descriptions, which are descriptions similar to the related descriptions,
the computer is further configure to specify a priority of the group of similar descriptions, and
the computer controls the projector to display a relationship between at least one similar description in the displayed similar description group and the object having smell or taste corresponding to the similar description.

9. A non-transitory computer readable medium storing a program causing a computer to:
receive (i) first identification information stored in a first non-transitory storage medium of a card and (ii) second identification information stored in a second non-transitory storage medium of an object, obtained by a sensor via near field communication;
identify a card description based on the first identification information stored in the first non-transitory storage medium of the card;
identify a sense of smell or taste associated with the object based on the second identification information stored in the second non-transitory storage medium of the object;
control a projector to display a related description group comprising a plurality of related descriptions, the related description group being related to the sense of smell or taste that corresponds to the card description;
specify a priority for each related description included in the related description group; and
control the projector to display a relationship between at least one of the related descriptions included in the related description group and the object that is associated with the sense of smell or taste described by the at least one of the related descriptions, the relationship being displayed differently depending on the priority.

* * * * *